(No Model.) 2 Sheets—Sheet 1.
H. P. ALDRICH.
MACHINE FOR LASTING BOOTS OR SHOES.
No. 303,604. Patented Aug. 19, 1884.
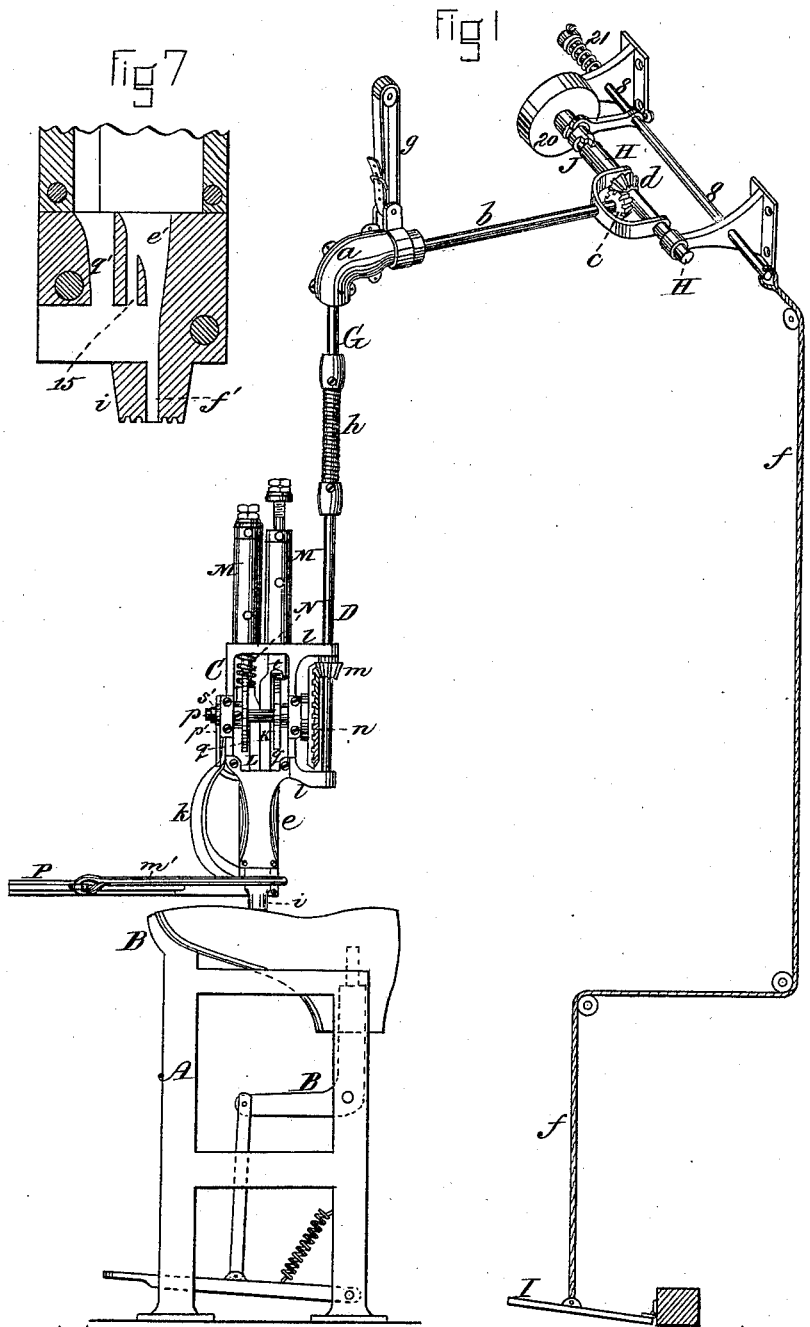
WITNESSES
INVENTOR (No Model.) 2 Sheets—Sheet 2.
H. P. ALDRICH.
MACHINE FOR LASTING BOOTS OR SHOES.
No. 303,604. Patented Aug. 19, 1884.
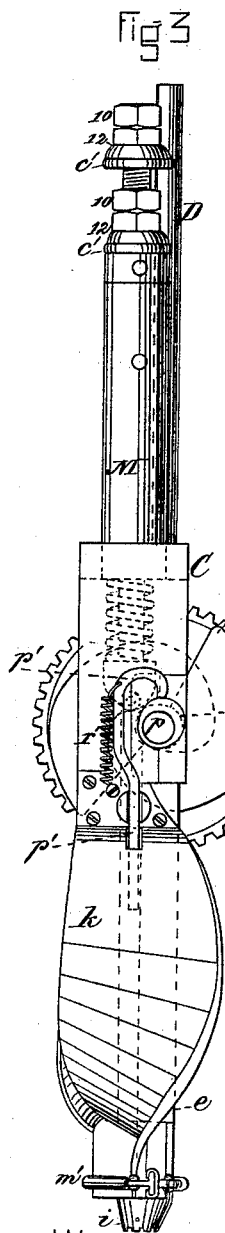
Fig 3
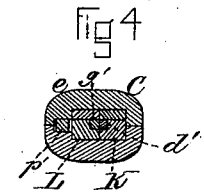
Fig 4
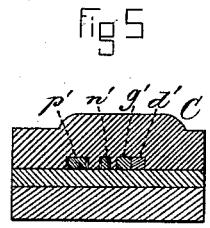
Fig 5
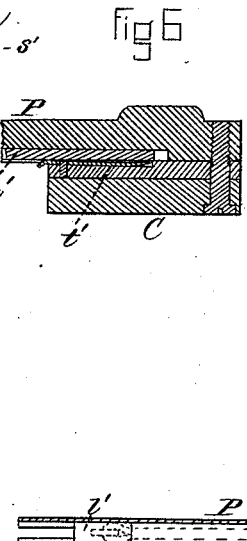
Fig 6
Fig 2
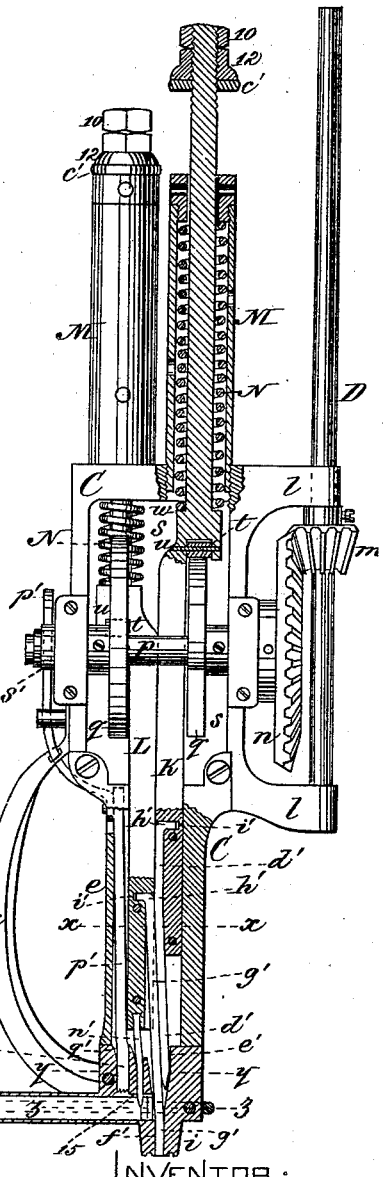
WITNESSES
W. J. Cambridge
Chas. E. Griffin
INVENTOR
Hosea P. Aldrich
Jas. E. Teschemacher
Atty.
N. PETERS. Photo-Lithographer, Washington, D. C.

UNITED STATES PATENT OFFICE.

HOSEA P. ALDRICH, OF SOMERVILLE, MASSACHUSETTS.

MACHINE FOR LASTING BOOTS OR SHOES.

SPECIFICATION forming part of Letters Patent No. 303,604, dated August 19, 1884.

Application filed March 14, 1884. (No model.)

*To all whom it may concern:*

Be it known that I, HOSEA P. ALDRICH, a citizen of the United States, residing at Somerville, in the county of Middlesex and State of Massachusetts, have invented certain Improvements in Machines for Lasting Boots and Shoes, of which the following is a full, clear, and exact description, reference being had to the accompanying drawings, making part of this specification, in which—

Figure 1 is a view of my improved lasting-machine, illustrating the mode of operating the same. Fig. 2 is a front elevation of the peg-driving mechanism, a portion being shown in section. Fig. 3 is a side elevation of the same. Fig. 4 is a horizontal section on the line $x$ $x$ of Fig. 2. Fig. 5 is a horizontal section on the line $y$ $y$ of Fig. 2. Fig. 6 is a horizontal section on the line $z$ $z$ of Fig. 2. Fig. 7 is a vertical section through the lower portion of the frame of the peg-driving mechanism, the awl, peg-driver, peg-cutter, and retainer-bar being removed therefrom.

My present invention relates, particularly, to an improved mechanism for driving pegs or fastening devices in lasting-machines, and in the manner of operating the same, and has for its object to provide a lasting-machine with a power mechanism or implement for driving pegs or other fastenings, which can be easily held and controlled by the operator with one hand, thus leaving his other hand free to properly draw or stretch the edges of the upper over the inner sole on the last, and prepare it for the reception of the pegs or fastenings which secure it to the inner sole, whereby a great saving in time and labor is effected, and the operation of lasting a boot or shoe greatly facilitated.

To this end my invention consists in the combination, with a suitable device for supporting the boot or shoe while being lasted, of a mechanism or implement for driving pegs or other fastenings adapted to be operated by power communicated thereto through a series of shafts connected by gearing to form a universal coupling, which will permit a universal movement of the implement, which is supported in such manner above the work that it can be grasped by the operator with one hand and freely moved thereby over any portion of the work to drive a peg or fastening at any desired point when set in operation by a foot lever or treadle connected with a clutch mechanism on the driving-shaft, thus enabling the operator to draw or stretch the edge of the upper over the inner sole and properly fit it in place with one hand, and with the other hand control the mechanism or implement for driving the pegs or other fastenings, and direct it to the desired point, when by depressing the treadle it will instantly be set in operation to drive a peg or fastening, as desired.

My invention also consists in certain details of construction and combinations of parts, as hereinafter set forth and specifically claimed, whereby the peg-driving mechanism is rendered more perfect and effective in its operation.

In the said drawings, A represents the frame-work or standard of the machine, which is provided with any suitable or well-known jack or device, B, for supporting and holding the last with the upper and inner sole applied thereto, the supporting device being preferably provided, if desired, with suitable mechanism for holding or drawing the edges of the upper over or upon the inner sole.

C represents the frame-work or stock of the peg-driving mechanism, which is provided with a vertical driving-shaft, D, adapted to be rotated by a shaft, G, connected by bevel-gears (not shown) within a casing, $a$, with a shaft, $b$, which in turn is connected by bevel-gears $c$ $d$ with the shaft H overhead, upon which revolves a pulley, 20, driven by a belt, (not shown,) a universal coupling or connection being thus provided, which serves not only to support the peg-driving mechanism above the work, but also admits of its stock C being grasped by the hand of the operator at the portion $c$, and freely moved into any desired position over the work and brought down thereon to drive a peg at any required point to fasten the edge of the upper to the inner sole, the peg-driving mechanism being set in operation to drive a peg by depressing a treadle, I, which is connected by a cord, $f$, or in any other suitable manner, with the shipper-rod S of a clutch mechanism, J, on the counter-shaft H, this clutch being moved in the opposite direction to disconnect the shaft H from the pulley by a spring, 21, at the end of the shipper-rod S when the pressure upon the treadle I is relieved. The upper shaft, b, of the universal coupling is supported in a horizontal or nearly-horizontal position at the desired height by a strap, g, which can be shortened or lengthened to limit the downward movement of the peg-driving mechanism, and the shaft G is preferably provided with a flexible portion, h, which admits of the peg-driving mechanism being easily inclined in any direction or hung up out of the way when not required for use. While the operator is controlling and directing the peg-driving mechanism with one hand, he grasps with his other hand at the same time the lasting-pinchers, and draws and fits the edges of the upper over the inner sole on the last in order to prepare the work for the reception of the pegs in advance of the peg-driving mechanism, a great saving in time and labor being thus effected, as both hands of the operator are simultaneously employed on different parts of the work, one hand being used to fit and prepare the work for the peg-driving mechanism, which is controlled and directed by the other hand to the point where the peg is to be driven, while the peg-driving mechanism itself is set in motion by depressing the treadle I with the foot, and thus operating the shipper of the clutch mechanism J.

I will now describe the construction and mode of operation of the peg-driving mechanism.

C is the stock or frame, the lower portion, e, of which, immediately above the nose-piece i, is of suitable size and form to adapt it to be grasped by the hand of the operator, for the purpose of guiding the nose-piece i to the point where the peg is to be driven, a guard, k, being secured to one side of the portion e, against which the back of the hand of the operator is braced to better enable him to counteract the tendency of the frame C to be turned on its vertical axis by the rotation of the vertical driving-shaft D. The shaft D is supported in lugs or projections l, and carries a bevel-gear, m, which engages with a bevel-gear, n, on a horizontal shaft, p, having its bearings in and extending transversely across the upper portion of the frame C.

To the shaft p are secured at a short distance apart two cams, q q, which lie within a rectangular opening, s, in the frame C, and upon these cams rest the friction-rolls t t of a pair of vertical slides or plunger-bars, K L, which are arranged side by side in contact with each other for a portion of their length, and move or reciprocate in a suitable guideway or groove in the frame C. The upper portion of each plunger above the offset u extends up through a tube, M, secured to the upper portion of the frame C, within which is placed a stiff spiral spring, N, which encircles the plunger and is confined between a shoulder, w, thereon and the upper closed end of the tube M, and thus as each plunger is raised by its cam q, the spring N will be compressed until the point a' of the cam passes out from beneath the friction-roll t, when the spring will cause the plunger-bar to descend with great force for a purpose to be presently described, the cams being so arranged on the shaft with respect to each other as to produce an alternate vertical movement or reciprocation of the plunger-bars. Each plunger-bar is provided above its tube M with a screw-thread, over which are placed the nuts 10 12, which form an adjustable head for limiting the downward movement of the plunger-bar, and beneath each of the nuts 12 is placed an elastic washer, c', which serves as a cushion to relieve the concussion or jar produced by the spring on the descent of the plunger-bar.

To the lower end of the plunger-bar K is secured an awl, d', formed of spring-steel, which slides in a suitable groove or passage, e', in the lower portion of the frame C, and is adapted to pass through the vertical aperture f' in the nose-piece i on the descent of the plunger-bar K, to form a hole for the reception of a peg which is driven down through this same aperture f', after the ascent of the awl, by the peg-driver g', which consists of a square spring-bar secured at its upper end to the plunger-bar L, and lying alongside of and in contact with the awl d'. The groove or passage e' is of sufficient width and of suitable shape to allow the awl and peg-driver as they alternately ascend and descend to be sprung or forced the one by the other out of the way, in order that they may each pass in turn down through the same aperture f' in the nose-piece without interfering with each other, the opposite sides of the passage e' being inclined in order to guide or direct the lower ends of the awl and peg-driver into the aperture f' in the nose i as they descend. The nose-piece i is serrated or roughened on its under side to prevent it from slipping on the work. The awl and peg-driver each fit within a rectangular groove cut longitudinally in its plunger-bar, as seen in Fig. 4, and the upper ends of both the awl and peg-driver are bent at a right angle, as seen at h', Fig. 2, this bent portion fitting into a groove or recess, i', in its plunger-bar, a simple, secure, and positive means of fastening the awl and peg-driver to their plunger-bars being thus provided, which will readily allow of attachment and detachment and effectually guard against displacement from the shock or jar of the springs.

P is the peg-wood holder which communicates with the passage e', in which the awl and peg-driver move, and contains the strip k' of peg-wood, which is fed forward to bring its inner end beneath the peg-driver by a follower, l', which is actuated by a spring, m'. Any other suitable device may, however, be employed for feeding forward the strip of peg-wood, if preferred.

To the plunger-bar L, which carries the peg-driver $g'$, is also secured a knife or cutter, $n'$, which moves in a groove or guideway, 15, and is placed at a distance from the peg-driver equal to the width of a single peg, and on each descent of the driver a peg is cut from the strip $k'$ ready to be driven by the peg-driver on its next descent through the aperture $f'$ in the nose-piece $i$. While the awl is being driven down to form the hole for the peg the peg-wood is held back by the pressure thereon of the lower serrated end of a retainer-bar, $p'$, which slides in a suitable groove or guideway, $q'$, and is raised against the force of a spring, $r'$, Fig. 3, by a cam, $s'$, on the shaft $p$. As soon as the awl has risen out of the aperture $f'$ in the nose $i$, the pressure of the bar $p'$ on the peg-wood is relieved, when the latter will be forced forward by the spring $m'$ to bring the peg previously split off by the knife $n'$ into a position immediately beneath the driver $g'$ and in line vertically with the aperture $f'$ in the nose-piece $i$, when it will be forced down by the driver $g'$ on its next descent through the aperture $f'$ into the hole previously made by the awl in the sole of the boot or shoe beneath.

$t'$, Fig. 6, is a flat spring which bears lightly on the peg cut off by the knife $n'$ and serves to retain it in a proper vertical position as it is being fed forward to insure its being struck squarely on its upper end by the peg-driver $g'$ on its descent. As the driver $g'$ ascends, the retainer $p'$ descends onto the upper edge of the strip $k'$ of peg-wood and holds it back out of the way of the awl, which is then driven down by its spring N to make a new hole, when the operation proceeds as before, a peg being driven at each complete revolution of the shaft $p$, and as soon as one peg is driven the operator removes his foot from the treadle I, thus stopping the rotation of the shaft D, when the movement of the parts will be arrested until the nose-piece $i$ of the machine is placed by the operator at a point on the sole where another peg is to be driven, when the mechanism is again set in operation as before by depressing the treadle I to drive another peg, as desired.

If desired, an automatic device or stop motion may be employed, which will operate the clutch mechanism after a single peg has been driven, thus preventing the driving of more than one peg in case the operator should neglect to relieve the treadle I from the pressure of his foot.

Instead of a straight peg-wood holder, P, it is obvious that the machine may be provided with any well-known circular holder adapted to contain a coil of peg-wood to be fed forward by a suitable spring-follower or other suitable feeding mechanism.

It is evident that by a proper modification of the mechanism it may be adapted to drive metal nails or other fastenings, instead of wooden pegs, and that such an implement could be suspended and connected with the shaft H by the universal connection previously described, and adapted to be thrown into and out of action by a clutch mechanism and treadle in the same manner as the pegging implement first described. I do not therefore wish to confine myself to either a pegging or a nailing implement in the operation of lasting a boot or shoe, as the essential feature of my invention consists in hanging or supporting the implement which drives the pegs or other fastening devices in such a manner above the work that it can be controlled and directed to any desired point by the operator with one hand, and set in operation by a foot-lever or treadle, leaving the other hand of the operator free to prepare the work in advance of the implement which drives the pegs, nails, or other fastenings.

I am aware that it is not new to suspend the driving mechanism so as to be moved by one hand, leaving the other hand free to manipulate the work; but such driving mechanism has heretofore been operated by means of a treadle. Such construction I do not claim.

What I claim as my invention, and desire to secure by Letters Patent, is—

1. In a lasting-machine, a device for supporting the boot or shoe while being lasted, and a mechanism or implement for driving a peg or other fastening device, consisting of the frame C, tubes M, plunger-bars K and L, springs N, and cams $q$, in combination with gears $c$, $d$, $m$, and $n$, with their connections, the shaft H, and band-wheel 20, all constructed to operate substantially as and for the purpose set forth.

2. In a lasting-machine, a device for supporting the boot or shoe while being lasted, a mechanism or implement, as described, for driving a peg or other fastening device, the gears $c$, $d$, $m$, and $n$, with their connections, as shown, the shaft H, and band-wheel 20, in combination with the clutch mechanism J, shipper-rod 8, spring 21, cord $f$, and treadle I, all constructed to operate substantially as and for the purpose set forth.

3. In a lasting-machine, the combination, with the reciprocating plunger-bars K L, recessed as shown, and their actuating mechanism, of the spring-awl and peg-driver secured in said recesses in the plunger-bars, and arranged to slide in contact with each other, and adapted to move the one out of the way of the other, to permit of their alternate passage through a single aperture in the nose-piece $i$, and the cutter $n'$, secured to the plunger L, substantially as set forth.

4. In a lasting-machine, the combination, with the reciprocating plunger-bars K L, provided with grooves or recesses $i'$, of the awl $d'$ and peg-driver $g'$, having their upper ends, $h'$, bent and adapted to fit within the said grooves or recesses $i'$, substantially in the manner and for the purpose described.

5. In a lasting-machine, the combination, with the reciprocating plunger-bars K L, provided with grooves or recesses for the awl $d'$ and peg-driver $g'$, and the peg-wood holder P, of the knife or cutter $n'$, secured to the plunger-bar L of the peg-driver, and means, substantially as described, for preventing the advance of the peg-wood, consisting of a retainer-bar, $p'$, working in a guide, $q'$, whereby the peg is held back during the operation of the awl to form the hole, substantially as set forth.

6. In a lasting-machine, the combination, with the reciprocating plunger-bars K L, the awl $d'$, and peg-driver $g'$, secured thereto, the knife or cutter $n'$, secured to the plunger-bar L, and the peg-wood holder P, of the vertically-sliding retainer-bar $p'$, operated by the cam $s'$ on the shaft $p$, and the spring $r'$, all constructed to operate substantially in the manner and for the purpose described.

7. In a lasting-machine, the combination, with the alternately-reciprocating awl $d'$, and peg-driver $g'$ and the knife or cutter $n'$, attached to the plunger-bar L, of the spring $t'$, for holding the peg cut or split off by the knife $n'$ in a vertical position, to insure its being struck squarely by the peg-driver in its descent, substantially as set forth.

8. In a lasting-machine, the combination, with the frame C, the reciprocating plunger-bars K L, provided with grooves or recesses $i'$, and the spring-awl and peg-driver secured thereto and operating as described, of the nose-piece $i$, serrated on its under side, and provided with a single vertical aperture, $f'$, for the passage of the awl, peg, and peg-driver, and having passages or grooves $e'$, $q'$, and 15, all constructed to operate substantially as set forth.

9. In a lasting-machine, the combination, with the shaft $p$, and mechanism connected therewith for driving a peg or fastening device, of the vertical driving-shaft D, connected with the said shaft $p$ by bevel-gears $m$ $n$, substantially as and for the purpose set forth.

Witness my hand this 10th day of March, A. D. 1884.

HOSEA P. ALDRICH.

In presence of—
P. E. TESCHEMACHER,
W. J. CAMBRIDGE.